United States Patent [19]
Bidon et al.
[11] Patent Number: 4,793,144
[45] Date of Patent: Dec. 27, 1988

[54] AIR CONDITIONING INSTALLATION WITH CENTRIFUGAL SPRAYERS

[75] Inventors: Daniel Bidon, Verdon; Joëlle Garet, Chateau-Thierry, both of France

[73] Assignee: Societe Airbi SA, Chateau-Thierry, France

[21] Appl. No.: 133,033

[22] PCT Filed: Feb. 26, 1987

[86] PCT No.: PCT/FR87/00048

§ 371 Date: Dec. 17, 1987

§ 102(e) Date: Dec. 17, 1987

[87] PCT Pub. No.: WO87/05379

PCT Pub. Date: Sep. 11, 1987

[30] Foreign Application Priority Data

Mar. 5, 1986 [FR] France ................................ 86 03207

[51] Int. Cl.⁴ ........................... B01F 3/02; F28D 3/00

[52] U.S. Cl. ........................................ 62/171; 165/20; 236/44 B; 261/84

[58] Field of Search ............. 236/44 C, 44 B; 62/171, 62/676.4; 165/20; 261/84

[56] References Cited

U.S. PATENT DOCUMENTS

| | | | |
|---|---|---|---|
| 2,101,603 | 12/1937 | Stimson | 261/90 |
| 2,904,254 | 9/1959 | Bahnson | 236/44 |
| 3,671,023 | 6/1972 | Seil | 261/26 |
| 4,118,945 | 10/1978 | Boochever et al. | 62/176.4 |
| 4,572,428 | 2/1986 | Groff et al. | 236/44 A |

FOREIGN PATENT DOCUMENTS

| | | |
|---|---|---|
| 1013918 | 8/1957 | Fed. Rep. of Germany . |
| 851937 | 1/1940 | France . |
| 2086617 | 5/1982 | United Kingdom . |

*Primary Examiner*—William E. Wayner
*Attorney, Agent, or Firm*—Cushman, Darby & Cushman

[57] ABSTRACT

The invention concerns an air conditioning installation with centrifugal sprayers (1). Said installation is essentially comprised of centrifugal sprayers (1) each provided with a deflector (2) and connected to a loop circuit (3) incorporating a buffer reservoir (4) which is supplied with liquid, a centrifugal purifier (5), a filter (6), a pump (7), individual flow regulating devices (8) and a collective flow regulating electro-valve (9), controlled by a regulation device (10) which is servo-controlled by a temperature sensor (11) and by a hygrometry sensor (12). The driving motors (13) for the sprayers (1) are power supplied through an adjustable frequency inverter (14).

10 Claims, 2 Drawing Sheets

AIR CONDITIONING INSTALLATION WITH CENTRIFUGAL SPRAYERS

The invention concerns an air conditioning/treatment installation with centrifugal sprayers.

On certain premises, the hygrometry and temperature have to be kept within values compatible with specific utilization of the premises, whatever the outside environmental conditions, as it is the case in buildings equipped with a collective air conditioning installation, certain stores or warehouses, greenhouses and breeding/rearing buildings.

Particularly in greenhouses, rather strictly controlled relative humidity and temperature conditions have to be maintained which, combined with periodic, well-adapted waterings and treatments, enable obtaining maximum production output. In this area, it may be profitable (in order to restrict investment costs) to also use the hygrometric control installation to ensure periodic phytosanitary treatment of the plants, or even to ensure watering.

Certain means are already available to ensure constant hygrometry in greenhouses:

A device consisting of a rotary disk, notched on its periphery and which receives in its center the liquid then sprayed in the form of a thinner and thinner film towards the disk periphery. The peripheral notches create cyclic cut-outs of the fluid film. The particle dimension decreases as a function of the rotary speed of the disk.

A device which combines air and water: water is sprayed by compressed air in a spray nozzle.

Pressurized water installations, which ensure very thin spraying by means of jet pipes of a very small section.

Ultrasonic division, by very fast compressed air passage through a special chamber, supplied with a fluid: this causes the fluid scattering into fine particles.

All the above devices are rather fragile, use a lot of power, are rather susceptible to scaling and clogging and in certain cases, do not allow for the required spraying fineness.

The present invention is designed to remedy such problems. The invention as defined in the patent claims enables meeting the requirement to develop an air conditioning installation capable of maintaining humidity and temperature within a well-defined range, and allowing for the distribution of phytosanitary, nutritional, antiseptic or other products.

This air conditioning installation (with centrifugal sprayers) is mainly characterized by its components: it consists of centrifugal sprayers, each provided with a deflector the shape and slant of which are a function of the area to be covered. The sprayers are hydraulically connected to a loop circuit incorporating a buffer reservoir (supplied with liquid), a centrifugal purifier, a self-cleaning filter, a pump, individual flow regulating devices, a collective flow regulating electro-valve controlled by a regulation device (which is servo-controlled by a temperature sensor and a hygrometry sensor). The driving motors for the sprayers are power supplied through an adjustable frequency inverter.

The deflectors (fitted to the sprayers) present themselves in the form of a flat corolla (which may be concave or convex-shaped), secured to the base of the driving motor and making an angle $\bar{a}$ (75° to 90°) with respect to the motor shaft axis. The external edge of the deflectors is circular, elliptical or rectangular shape. The internal edge of the deflectors provides an opening around the base of the driving motors, with a passage section of approximately 1.5 times that of the centrifugal spraying head.

The larger deflector dimension is approximately three times the outer diameter of the centrifugal spraying heads, while the opening diameter roughly matches 1.5 times the outer diameter of the heads.

The internal edge of the deflectors is equipped with an annular gutter, for drippings recovery and recycling through a duct (which is connected to the centrifugal sprayer hydraulic supply line).

The centrifugal spraying head is topped by a fixed disk, at an adjustable distance from the upper edge of the centrifugal spraying head. The distance X of the fixed disk with respect to the deflector opening roughly matches one quarter of the spraying head diameter.

The invention advantages mainly reside in design simplicity, since centrifugal force ensures the scattering of liquids (even when loaded) and the deflector fitted to each sprayer ensures the spraying function. The spraying fineness adjustment function (through spraying head rotational speed adjustment) enables adapting the installation to any required application.

Various features and advantages are mentioned hereinafter, in the description of the greenhouse air conditioning installation implemented according to this invention and given as a non restrictive example, cross-referenced to the appended drawings on which:

Figure 2:
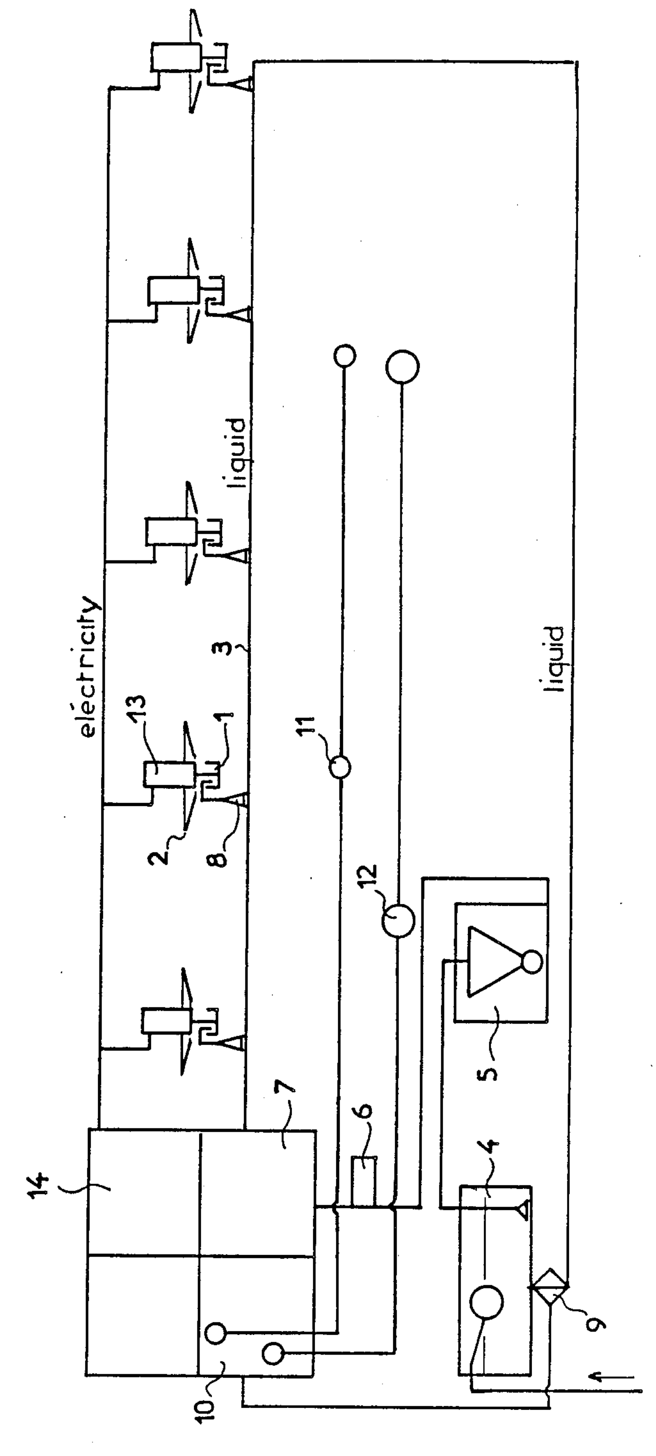
FIG. 2 is a functional diagram of the air conditioning installation.

FIG. 2 shows a greenhouse air conditioning installation mainly comprised of centrifugal sprayers (1) each provided with a deflector (2) and connected to a loop circuit (3) incorporating a buffer reservoir (4) which is supplied with liquid, a centrifugal purifier (5), a self-cleaning filter (6), a pump (7), individual flow regulating devices (8) and a collective flow regulating electro-valve (9) controlled by a regulation device (10) which is servo-controlled by a temperature sensor (11) and by a hygrometry sensor (12). The driving motors (13) for the sprayers (1) are power supplied through an adjustable frequency inverter (14).

Figure 1:
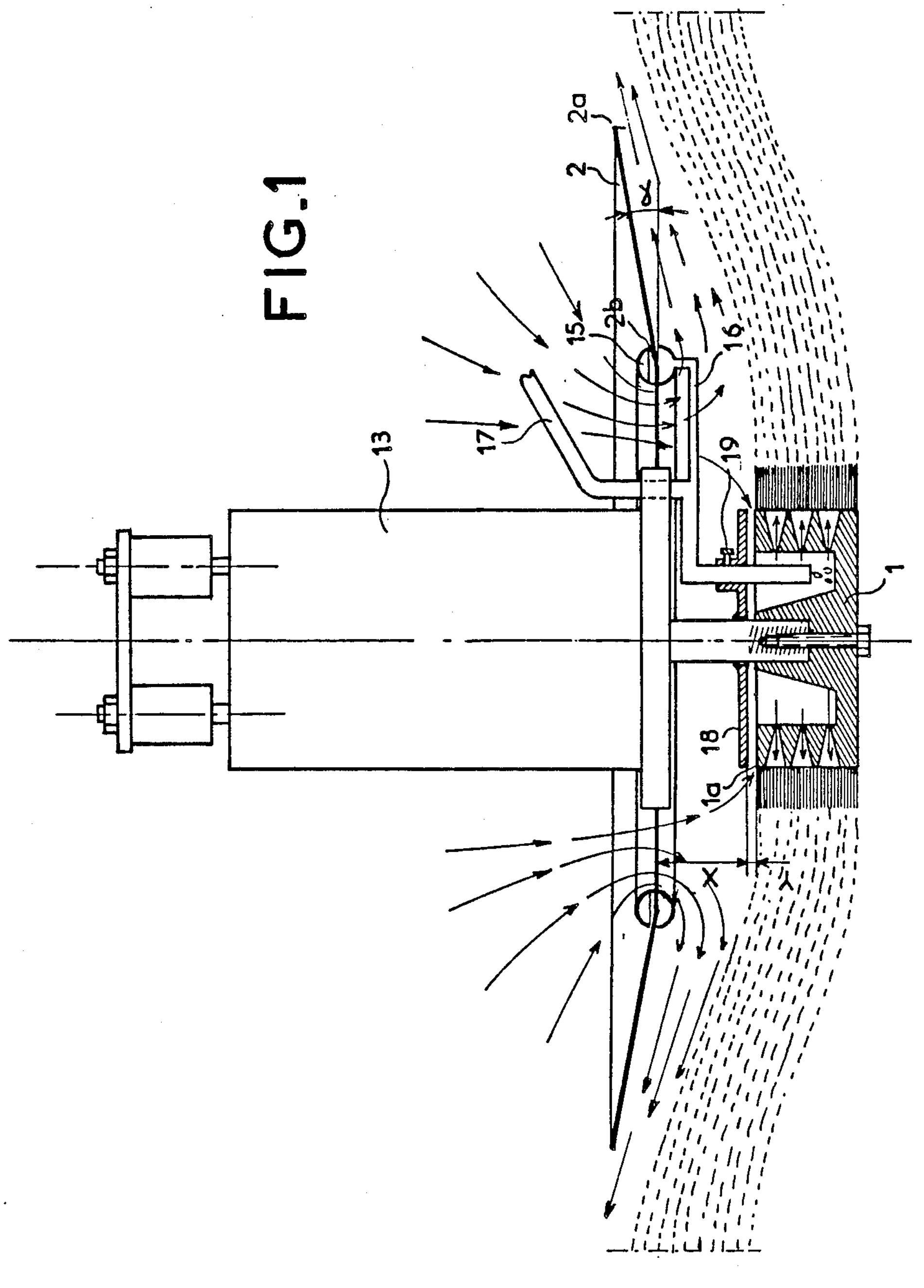
FIG. 1 is a front view of a centrifugal spraying device shown in section.

FIG. 1 shows a centrifugal sprayer (1), fitted with a deflector (2), secured to the base of the driving motor (13), featuring an annular gutter (15), and that is connected to the supply piping (17) by means of a duct (16). The centrifugal sprayer head (1) is topped by a disk (18) through which the supply piping (17) is routed: the disk is attached (by means of an adjustable device) to the piping, so as to enable changing the separation distance Y of the centrifugal sprayer head (1). The adjustment is made by means of a locking screw (19).

As shown in FIG. 2, the internal edge **(2*b*) of the deflector (2), around the base of the driving motor (13), allows for an air passage around the motor: the air circulation, combined with the shape and slant angle $\bar{a}$ of the deflector (2), results in long range projection of the liquid particles by Coanda effect (the throwing effect may be augmented by using a concave or convex-section corolla). The area covered by each sprayer is adjustable as a function of the shape of the deflector external edge (2*a*)**. Specifically, a rectangular shape enables covering the greenhouse over the maximum possible portion of its length, while restricting the crosswise covering to the useful width of the greenhouse, in order to avoid throwing projections to the walls.

The drippings collected on top of an underneath the deflector (2) are recovered in the annular gutter (15) (slit outwards) and then directly recycled into the spraying head (1) through the duct (16) and piping (17).

The separation distance of the deflector (2) with respect to the spraying head (1), as well as its slant angle a with respect to the perpendicular plane to the shaft axis of the motor (13), determine the projection angle. The optimum angle a is approximately 15°. A given separation distance Y of the fixed disk (18) with respect to the upper edge (1*a*) of the spraying head (1), allows for air penetration into the spraying head cavity; this improves liquid spraying and flowing. The air proportion with respect to the liquid flow rate is adjustable by means of the locking screw (19).

On FIG. 2, one will note that the rotational speed of the centrifugal sprayers (1) (and, consequently, the spraying degree) can be collectively adjusted by acting on the frequency inverter (14). Flow rates may be individually adjusted by acting on the adjustment devices (7). Maintaining a given hygrometry and temperature within the enclosure is ensured through sensors (11) and (12) of the regulation device (10) which controls the collective flow regulating electro-valve (9) (for the sprayers (1)), from the supply loop (3) feedback line.

The buffer reservoir (4) supply is regulated by means of a float.

The driving motors of the centrifugal sprayers (1), of a 180–200 Watt power, ensure head motion driving at 3,500 RPM, under 50 Hz frequency; the frequency inverter (14) raises this frequency to 10,000 RPM for 150 Hz, then to 15,000 RPM for 200 Hz (which corresponds to fogging speed).

In the case of a 20–25 KW power installation, it is possible to operate 50 to 60 spraying heads simultaneously, which enables spraying 10,800 liters per hectare per hour.

We claim:

1. An air conditioning installation with centrifugal sprayers, characterized by it mainly comprising of centrifugal sprayers (1) each provided with a deflector (2) the shape and slant angle of which are defined as a function of the area to be covered; wherein the sprayers are hydraulically connected to a loop circuit (3) including: a buffer reservoir (4) which is supplied with liquid, a centrifugal purifier (5), a self-cleaning filter (6), a pump (7), individual flow regulating devices (8) and a collective flow regulating electro-valve (9) controlled by a regulation device (10) which is servo-controlled by a temperature sensor (11) and by a hygrometry sensor (12); wherein the driving motors (13) for the centrifugal sprayers (1) are power supplied through an adjustable frequency inverter (14).

2. An air conditioning installation according to claim 1, wherein the deflectors (2) with which are fitted the centrifugal sprayers (1) consist of a flat corolla, concave or convex-shaped, secured to the base of the driving motor (13) and forming an angle $\bar{a}$ (75° to 95°) with respect to the driving motor shaft axis.

3. An air conditioning installation according to claim 1, wherein the external edge (2*a*) of the deflectors (2) is of circular, elliptical or rectangular shape.

4. An air conditioning installation according to claim 1, wherein the internal edge (2*b*) of the deflectors (2) allows for a remaining passage, around the base of the motor (13) and of a cross section approximately matching 1.5 time that of the centrifugal sprayer head (1).

5. An air conditioning installation according to claim 1, wherein the opening diameter of the deflectors (2) approximately matches 1.5 times the external diameter of the centrifugal sprayer head (1).

6. An air conditioning installation according to claim 1, wherein the deflectors (2) match, in their larger dimension, approximately three times the external diameter of the centrifugal sprayer heads (1).

7. An air conditioning installation according to claim 1, wherein the internal edge (2*b*) of the deflectors (2) is provided with an annular gutter (15) which ensures recovery of the drippings and their direct recycling through a duct (16) connected to the supply piping (17) of the centrifugal sprayer head (1).

8. An air conditioning installation according to claim 1, wherein the sprayer head (1) is topped by a fixed disk (18), of which the distance with respect to the upper edge (1*a*) of the centrifugal sprayer head (1) is adjustable.

9. An air conditioning installation according to claim 8, wherein the disk (18) is secured to the supply piping (17), which crosses through the disk, the attachment function being ensured by a locking screw (19).

10. An air conditioning installation according to claim 8, wherein the fixed disk (18), which is mounted on top of the sprayer head (1), is located at a distance X with respect to the opening of the deflector (2), the distance X approximately matching one quarter of the centrifugal sprayer head (1) diameter.

* * * * *